United States Patent [19]

Mueller et al.

[11] 3,849,162
[45] Nov. 19, 1974

[54] PROCESS FOR PREVENTING THE STAINING OF POLYAMIDE FIBRE MATERIAL TREATED WITH FLUORESCENT WHITENERS

[75] Inventors: Volkmar Mueller, Arlesheim; Hans-Ulrich Berendt, Allschwil; Melvin Harris, Arlesheim, all of Switzerland

[73] Assignee: Ciba-Geigy AG, Basel, Switzerland

[22] Filed: May 30, 1972

[21] Appl. No.: 257,722

[30] Foreign Application Priority Data

June 7, 1971 Switzerland.......................... 8274/71

[52] U.S. Cl.......... 117/33.5 T, 117/138.8 N, 8/1 W, 8/74, 8/84, 8/156, 28/75
[51] Int. Cl............................................. D06m 3/40
[58] Field of Search............... 117/33.5 T, 138.8 N; 28/75; 8/74, 156, 1 W, 84

[56] References Cited
UNITED STATES PATENTS

| 3,182,059 | 5/1965 | Konishi et al. | 117/33.5 T |
|---|---|---|---|
| 3,265,461 | 8/1966 | Luetzel et al. | 8/1 W |
| 3,290,111 | 12/1966 | Hees et al. | 8/74 |
| 3,371,089 | 2/1968 | Gold et al. | 117/33.5 T |
| 3,485,761 | 12/1969 | Haxby et al. | 117/33.5 T |
| 3,490,860 | 1/1970 | Soiron et al. | 8/74 |
| 3,642,783 | 2/1972 | Siegrist et al. | 8/1 W |
| 3,682,900 | 8/1972 | Liechti et al. | 117/33.5 T |

FOREIGN PATENTS OR APPLICATIONS

| 3,710 | 0/1964 | Switzerland | |
|---|---|---|---|
| 7,796 | 0/1964 | Switzerland | |
| 12,362 | 0/1964 | Switzerland | |
| 432,485 | 0/1962 | Switzerland | |
| 1,535,352 | 0/1968 | France | |
| 715,919 | 0/1954 | Great Britain | |
| 929,053 | 6/1963 | Great Britain | 8/178 |

*Primary Examiner*—William D. Martin
*Assistant Examiner*—William R. Trenor
*Attorney, Agent, or Firm*—Joseph G. Kolodny; Edward McC. Roberts; Prabodh I. Almaula

[57] ABSTRACT

Polyamide fibre material treated with fluorescent whiteners (also known as optical brighteners) is prevented from being stained by applying to the fibre material either simultaneously with the fluorescent whitener or in the form of an aftertreatment of the whitened fibre material, an emulsion containing a water-soluble fixing agent with affinity to fibres, an organic solvent or solvent mixture and at most 10 % of water, relative to the preparation, and optionally an organo-soluble dispersing agent. The process is carried out at 20° to 120°C according to the exhaustion method. The finish renders the fibrous material resistant to staining and soiling.

13 Claims, No Drawings

PROCESS FOR PREVENTING THE STAINING OF POLYAMIDE FIBRE MATERIAL TREATED WITH FLUORESCENT WHITENERS

The present invention relates to a process for preventing the staining of fibre material treated with fluoroescent whiteners (also known as optical brighteners), in particular polyamide fibre material. The process consists in applying to the fibre material, either simultaneously with the fluorescent whitener or in the form of an aftertreatment of the whitened fibre material, at temperatures of 20° to 120°C, preparations which contain a water-soluble fixing agent with affinity to fibres, an organic solvent or solvent mixture and at most 10 percent water, relative to the liquor, and optionally an organo-soluble dispersing agent.

By staining is meant hereinafter the undesirable transfer of dyestuffs from one dyed substrate to another substrate which is dyed in a different shade, but in particular is white. The substrates are preferably textile fibre materials.

These preparations are manufactured, for example, by stirring the fixing agent with the dispersing agent to form a paste and subsequently diluting the paste with an organic solvent to the desired volume; before or after the addition of the organic solvent, water may optionally be added. However, it has proved very suitable to dissolve the fixing agent in a small amount of water and then to correspondingly dilute this solution by adding a solution of the dispersing agent in the organic solvent. Fixing agent dispersions in organic solvents which are stable and do not demulsify are thereby obtained. Instead of water, it is also possible to use a hydrophilic solvent which is readily miscible with water.

Suitable solvents for the process according to the invention are, for example, solvents which are immiscible with water or are miscible only to a limited extent, such as the petroleum hydrocarbons, e.g., petroleum ether, benzene and halogenated benzenes or benzenes which are substituted by lower molecular alkyl groups, for example toluene, xylene, ethyl benzene, cumene, mono- and dichlorobenzene; alicyclic compounds, for example tetralin and cyclohexane, cyclohexanol; preferably, however, halogenated hydrocarbons, e.g. the solvents used in the dry cleaning industry, trichloroethylene and perchloroethylene; furthermore, chloroform, ethylene chloride, carbon tetrachloride, dibromoethylene and the chlorinated ethanes, such as 1,1-dichloroethane, 1,2-dichloroethane, 1,1,1-trichloroethane and 1,1,1,2-tetrachloroethane. A further group consists of the solvents which are miscible with water, for example the aliphatic alcohols methanol, ethanol or the propanols; ketones, such as acetone, methyl ethyl ketone, cyclohexanone; ethers and acetates, such as diisopropyl ether, diphenyl oxide, dioxan, tetrahydrofuran; glycol derivatives, such as ethylene glycol monomethyl, monoethyl and monobutyl ether and diethylene glycol monomethyl or monoethyl ether, also pyridine, acetonitrile, diacetone alcohol, ethylene carbonate, γ-butyrolactone, N,N-dimethyl formamide, N,N-dimethyl acetamide, N-methylpyrrolidone, tetramethyl urea, tetramethylene sulphone, dimethyl sulphoxide etc.

It is also possible to use mixtures of the cited solvents.

The fixing agents having affinity to the fibres and which are applied to the fibre material to prevent staining by means of the actual fluorescent whitening process, but may also be present in the treatment bath together with the fluorescent whitener and then simultaneously become attached to the substrate, are as a rule anionic water-soluble compounds. They should not have any natural colour, or at least they should have no colour cast on the fibre substrate.

Particularly suitable fixing agents are the water-soluble anionic polycondensation products of diaryl sulphones having at least one phenolic hydroxyl group with formaldehyde. Suitable aromatic components are bicyclic, but are chiefly monocyclic compounds which have at least one phenolic hydroxyl group. Preferred substituents which may be present in the aromatic compounds are sulphonic acid groups, halogen atoms or alkyl radicals, in particular those with 1 to 4 carbon atoms. As such compounds there may be used: phenol, mono- or dialkyl, phenols, e.g. cresols or xylenols, mono- or diahalophenols, e.g. chlorophenols or dichlorophenols, resorcinol or pyrocatechol.

The sulphones are manufactured from the above described phenolic compounds by known methods, for example by reaction with sulphuric acid at elevated temperature. In so doing, it is also possible to use mixtures of the described aromatic components.

These sulphones undergo polycondensation with formaldehyde, the process being carried out by methods known in the art, for example in an acid or alkaline medium at elevated temperature. However, the condensation need not be carried out exclusively with sulphones, but also with mixtures of sulphones and sulphonic acids of the described phenolic compounds or also together with aromatic compounds which are free from hydroxyl groups, such as naphthalene or substitued naphthalane, e.g., the mono-, di- or trisulphonic acids of naphthalene, preferably naphthalene-2-sulphonic acid, or 1,2,3,4-tetrahydronaphthalenesulphonic acids. In this case, the polycondensation product should contain at least 30, but preferably 40 molar percent of sulphone. On the other hand, if solely sulphones undergo polycondensation, they are sulphonated either before the condensation or else the polycondensates are sulphonated. In this connection, it is also possible to introduce sulphonic acid groups both before and after the condensation with formaldehyde. Condensation products of aromatic sulphonic acids which are free from hydroxyl groups with formaldehyde are likewise suitable. Mention may also be made of those condensation products which, instead of the $SO_2$ group, contain in the diaryl sulphones described hereinbefore a sulphur atom (diarylsulphide type), an oxygen atom (diphenyl ether type), a methylene($-CH_2-$) or substituted methylene group or a keto group ($-C'=O$).

As dispersing agents for the manufacture of the dispersed fixing agent preparations it is advantageous to use anionic or non-ionic surface-active compounds, with care being taken that these have a good solubility in the organic solvents used. The solubility of the dispersing agents must not be less than 0.5 g/l.

Suitable representatives of such surface-active compounds are those which are obtained, e.g., by addition of ethylene oxide to long chain amines and alcohols, phenols or fatty acids containing from 12 to 22 carbon atoms. They belong to following types of compund:

a. ethers of polyhydroxy compounds, such as polyoxalkylated fatty alcohols, polyoxalkylated polyols, polyoxalkylated mercaptans and aliphiatic amines, polyalkylated alkylphenols and -naphthols, polyoxalkylated alkylarylmercaptans and alkylarylamines; also the corresponding esters of these compounds with polybasic acids, such as sulphuric or phosphoric acid, optionally also in the form of ammonium or amine salts;

b. fatty acid esters of ethylene and polyethylene glycols and of propylene and butylene glycol, of glycerol and of polyglycerols and pentaerythritol, also of sugar alcohols, for example sorbitol;

c. N-hydroxyalkyl-carbonamides, polyoxalkylated carboxylic amides and sulphonic amides.

As examples of dispersing agents from these groups which can be used with advantage there may be cited: the monoethanolamine salt of the phosphoric acid ester of the addition product of oleyl alcohol and 6 moles of ethylene oxide; the ammonium salt of the acid sulphuric acid ester of the addition product of 17 moles of ethylene oxide and oleyl alcohol; the addition product of 4 moles of ethylene oxide with nonylphenol; the addition product of 8 moles of ethylene oxide with 1 mole of p-tert.octylphenol; the addition product of 9 moles of ethylene oxide with nonylphenol; the addition product of 8 moles of ethylene oxide with cetyl or oleyl alcohol; the reaction product of coconut fatty acid and 2 moles of diethanolamine; of 15 or 6 moles of ethylene oxide with castor oil, of 20 moles of ethylenes oxide with the alcohol $C_{16}H_{33}OH$, ethylene oxide addition products with di-[α-phenylethyl]-phenols, polyethylene oxide-tert.-iodecyl thioether, polyamine-polyglycol ether, the addition product of 15 or 30 moles of ethylene oxide with 1 mole of the amine $C_{12}H_{25}NH_2$ or $C_{18}H_{37}NH_2$, oleic acid triethylene glycol ester, oleic acid polyethylene glycol 200-ester, oleic acid polyethylene glycol 400-ester, the adducts of 1 mole of oleic acid with 4 or 5 moles of ethylene oxide, the adduct of 4 moles of ethylene oxide with 1 mole of oleic acid sorbitan ester and sorbitan-monolaurate, -monopalmitate and -monostearate, the sodium salt of dodecylbenzene-sulphonic acid, the sodium salt of the phosphoric acid ester of the addition product of 5 moles of ethylene oxide with 2-ethyl-hexanol.

Also suitable are mixtures of the above cited surface-active compounds.

The fluorescent whitening agents which can be used according to the invention may belong to various classes of chemical compounds, but they must contain at least one water-solubilising group, for example a sulphonic acid and carboxylic acid group, which may also be present in the form of a salt, or a sulphonic acid amide group.

Suitable fluorescent whitening agents which contain at least ons sulphonic acid group, a carboxylic acid group or an amide group, are derived from the following basic types:

a. 4,4'-bis-(acylamino)-stilbene-2,2'-disulphonic acids of the formula

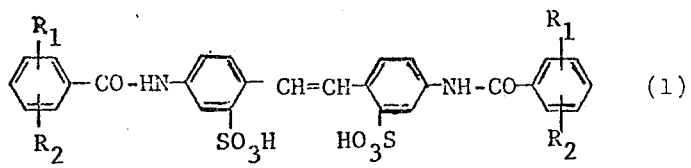

wherein $R_1$ represents e.g. —H or —CH$_3$ and $R_2$ represents —NH-CO-CH$_3$ or —OCH$_3$.

b. 4,4'-bis-(triazinylamino)-stilbene-2,2'-disulphonic acids of the formula

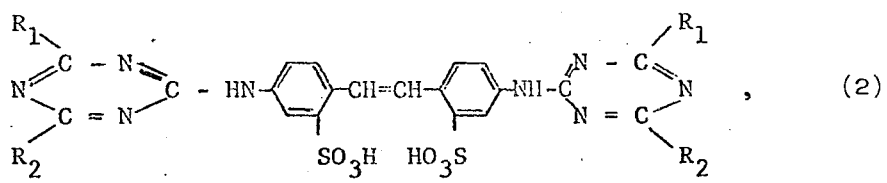

wherein $R_1$ and $R_2$ represents, e.g., a lower alkoxy, alkylamino, alkylolamino or anilino group.

c. 4,4'-bis-(azolyl)-stilbene-2,2'-disulphonic acids of the formula

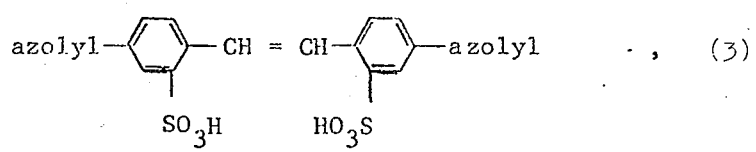

wherein the following groups may represent azolyl:

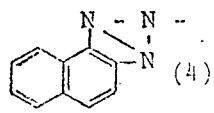

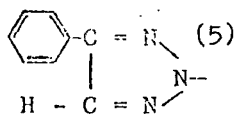

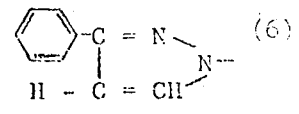

d. stilbyl-naphthotriazoles of the formula

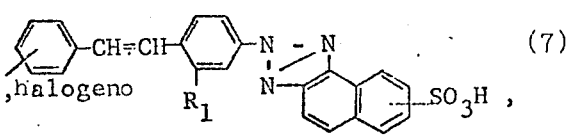

wherein the following substituents may represent $R_1$ —CN, —SO$_3$H, —SO$_2$NHC$_2$H$_5$, —SO$_2$NH(CH$_2$)$_3$, —SO$_2$CH$_2$CH$_2$OH,

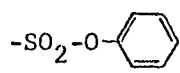

e. bis-(benzoxazol-2-yl)-derivatives of the general formula

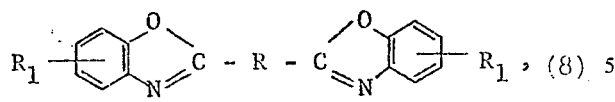

wherein R represents

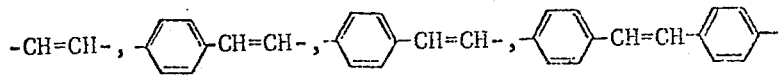

and 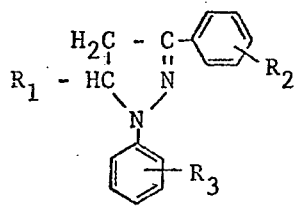, in which X = —NH, —S—, —O—, and $R_1$ may represent, e.g., a hydrogen atom, a lower alkyl group and sulphonic or carboxylic acid group.

f. monomethine-cyanines of the formula

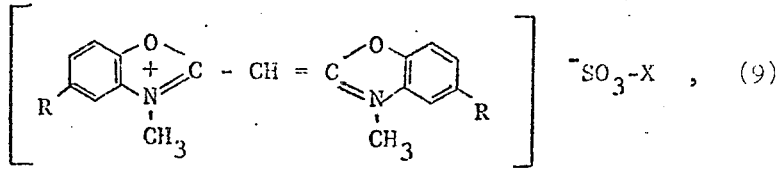

wherein R represents, e.g., an alkyl or alkoxy group and X represents an aryl or —O—alkyl group.

g. 2,7-bis-(aroylamino)-dibenzothiophene dioxide-3,6-disulphonic acids of the formula

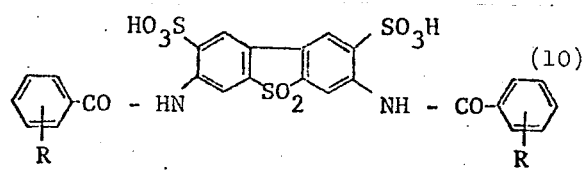

wherein R represents, e.g., an alkoxy or p-phenyl group.

h. 1,3-diaryl-pyrazolines of the formula

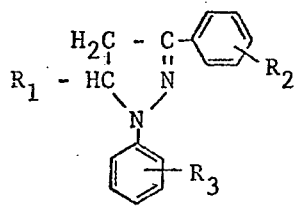

wherein $R_1$ represents, e.g., a hydrogen atom, an alkyl or aryl group, $R_2$ represents a hydrogen atom or a chlorine atom and $R_3$ represents a sulphonic acid, sulphonamide, carboxylic acid or carboxylic acid ester group.

i. Styrylbenzoxazoles of the formula

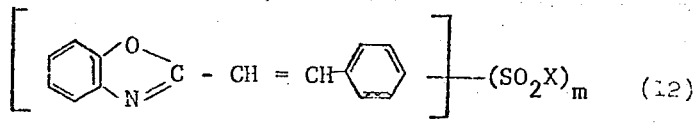

bis-styrylaryl compounds of the formula

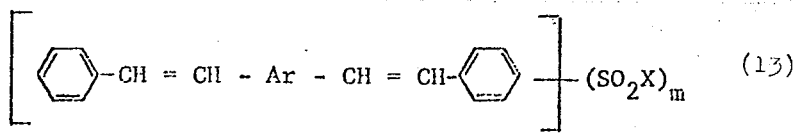

or bis-benzoxazolylaryls of the formula

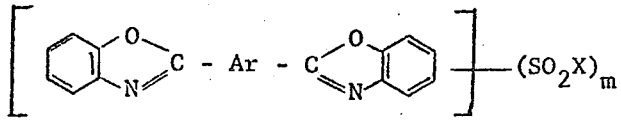

wherein X represents, e.g., —OH or —$NH_2$ and Ar is

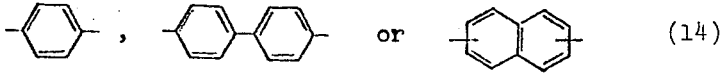

and $m$ is 1 to 4, preferably 1 and 2. In addition to the cited substituents, the compounds may also contain $^-SO_3$-X , (9)

further chromophoric substituents.

k. Oxidiazole compounds of the formula

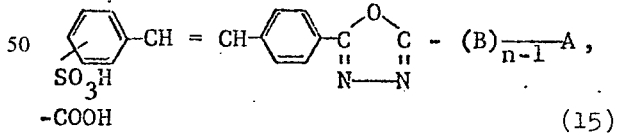

wherein B represents a phenylene, furylene or thienyl radical, A represents an aryl radical and $n$ is 1 or 2.

l. Quaternised benzofuranoylbenzimidazoles of the formula

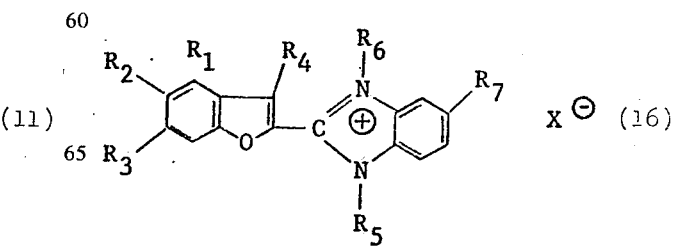

wherein $R_1$ and $R_2$ represent hydrogen or together represent a condensed benzene radical, $R_3$ represent hydrogen, methoxy or methyl, $R_4$ represents hydrogen or methyl, $R_5$ represents methyl, phenyl or benzyl, $R_6$ represents methyl or benzyl, $R_7$ represents hydrogen, methyl, methoxy, chlorine or methylsulphonyl and X represents chlorine, the methylsulphonic acid radical or the p-toluenesulphonic acid radical.

The water-insolubilising substituents cited in the given formulae together with the sulphonic and carboxylic acid groups have representative character and may be replaced or supplemented by further substituents which are common for the classes of the cited compounds.

It is also possible to use fluorescent whitening agents of different structure for the process according to the invention with equal success, provided that they possess at least one of the cited water-solubilising groups. Fluorescent whitening agents which possess two water-solubilising sulphonic acid groups prove especially advantageous for the present process.

Suitable fibre materials according to the invention are principally synthetic polyamide fibres, e.g., nylon 6, nylon 66, nylon 6,10 (from hexamethylene diamine and sebacic acid), nylon 11 or nylon 6,6/6 (copolymer of hexamethylene diamine, adipic acid and ε-caprolactam), and also blended fabrics which contain synthetic polyamide fibres. The fibre material may be in any desired stage of processing.

The fixing agent is applied simultaneously with the fluorescent whitener from organic solvent liquors by means of the exhaust process. For the single bath application, the treatment baths may be advantageously prepared for example as follows:

The fluorescent whitener is made into a paste with the dispersing agent, the paste diluted with the desired amount of an organic solvent and this preparation is mixed with a preparation of the fixing agent which is diluted in water or an organic solvent. Another sequence is also possible. If an aftertreatment with the fixing agent follows, the treatments with fluorescent whiteners can be carried out both in organic solvent liquors and in aqueous baths, in which latter case it is expedient to effect an intermediate drying of the fibres. The finishing with the fixing agent is always carried out from an organic solvent.

The temperature ranges for the application are between 20° and 120°C, preferably between 40° and 80°C. The treatment times are between about 1 and 30 minutes, preferably between 5 and 15 minutes, in the case of the aftertreatment and the simultaneous application.

The pH values of the preparations may be in the acid, neutral or alkaline range and comprise a range from about pH 4 to 9, preferably from pH 5 to 8.

It is possible to adjust the pH by means of the molecular organic acids containing from 1 to 4 carbon atoms, for example formic or acetic acid, or ammonia or suitable amines.

The amounts in which the fixing agent is applied varies within wide limits and in the padding process is 0.1 to 10 percent relative to the impregnating liquor, or 0.1 to 10 percent, preferably 0.5 to 5 percent relative to the fibre material in the case of the exhaust process.

The amount of dispersing agent required in each case varies correspondingly and preferably both components are proportional to each other, i.e., as the amount of fixing agent increases so also does the amount of dispersing agent. The ratio of fixing agent to dispersing agent is advantageously between 1:100 and 1:2. Suitable liquor ratios are between 1:5 and 1:100, preferably between 1:5 and 1:20.

In order to finish the fibre substrates which have been treated in a single bath or have been subjected to an aftertreatment, the liquor is advantageously centrifuged off and the materials are then dried in a flow of warm air.

The fibre substrates treated according to the invention are protected against staining when dyed or printed parts of the same or of another fibre substrate are washed, so that, e.g., in a domestic optionally brightened and finished parts of a fabric are not stained by rinsed out dye. It is also possible to protect the degree of whiteness of pure white optically brightened fibre substrates against staining. Suitable dyestuffs for dyeing synthetic polyamide fibres are preferably acid, disperse, reactive and metal complex dyes. They bebng, for example, to the known classes of mono- and disazo dyes, also of the anthraquinone, methine, azomethine, azostyryl and formazane dyes. These dyes, which are either water-soluble or only dispersible in water, may be used singly or in admixture. Optionally, it is also possible to use other suitable types of dye.

The following Examples illustrate the invention, the parts and percentages being by weight unless otherwise stated.

EXAMPLE 1

A piece of synthetic polyamide knitted material (nylon-Helanca-jersey) is treated at 50°C and in a liquor which contains in 200 ml of perchloroethylene 0.2 g of the fluorescent whitener of the formula

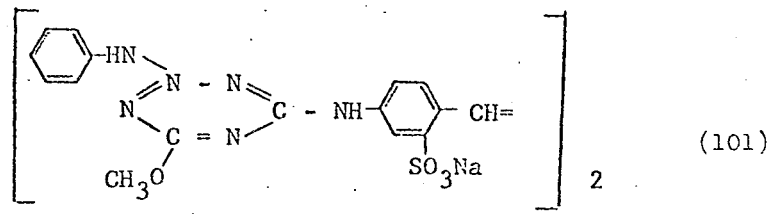

(101)

0.1 g of the fixing agent described below in 3 ml of water and 2 g of the surfactant mixture described hereinbelow.

The bulk of the liquor is subsequently removed by pumping off and centrifuging and the substrate is completely dried by a flow of warm air and freed from the last remaining traces of solvent. The substrates has a good whitened appearance. The simultaneously applied fixing agent protects the white ground from being stained when washed with a colored print and against staining in a domestic wash.

Manufacture of the fixing agent: to a suspension of 70 g of 4,4'-dihydroxydiphenylsulphone in 35 g of acetic anhydride is added dropwise while stirring and at room temperature 35 g of conc. sulphuric acid. The temperature is then raised to 98°–100°C and kept at this level for 6 hours. The 75 ml of water is added in small amounts at a pressure of 30 to 55 mm HG column. Simultaneously, 88 ml of liquid is distilled off from the reaction mixture. The residual reaction mixture is diluted with a further 20 ml of water, treated with 20 g of 30 percent aqueous formaldehyde solution and heated for 5 hours to 100°–105°C. The batch is then allowed to cool and the viscous condensation product is treated with 30 percent sodium hydroxide solution until a pH of 7 is reached. The resulting product may be diluted with water to any desired extent.

The surfactant mixture has the following composition:
1 part of the monoethanolamine salt of the phosphoric acid ester of the adduct of oleyl alcohol and 6 moles of ethylene oxide,
2 parts of the adduct of nonylphenol and 4 moles of ethylene oxide,
2 parts of perchloroethylene and
2 parts of water.

Instead of the above mentioned fluorescent whitener, it is also possible to use the whiteners of the following formulae:

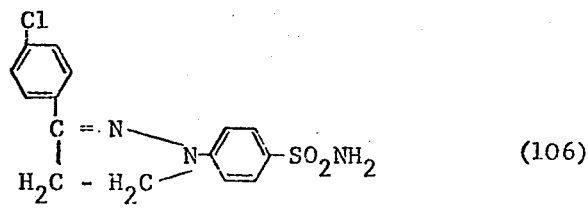

(106)

Example 2

2 g of the fluorescent whitener of the formula

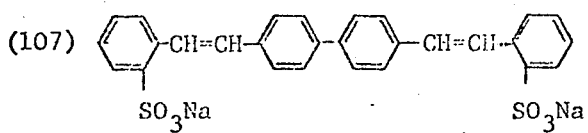

(107)

and 2 g of the condensation product of a sulphone mixture (4,4'-dihydroxy-diphenylsulphone-4,2'-dihydroxy-diphenylsulphone), phenolsulphonic acid and formaldehyde (fixing agent) are dissolved in 25 ml of water.

To this aqueous solution is added 15 g of the surfactant according to Example 1 in 1 litre of perchloroethylene. Polyamide woven jersey material (100g) is treated for 10 minutes at 70°C with the stable dispersion which forms immediately. The bulk of the excess

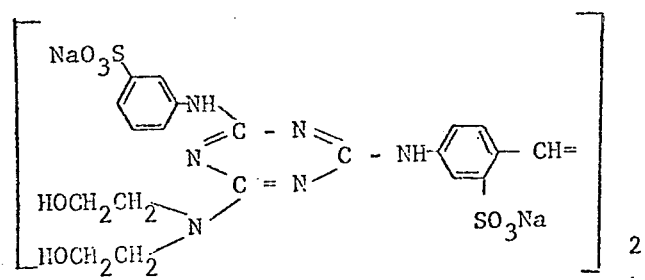

(102)

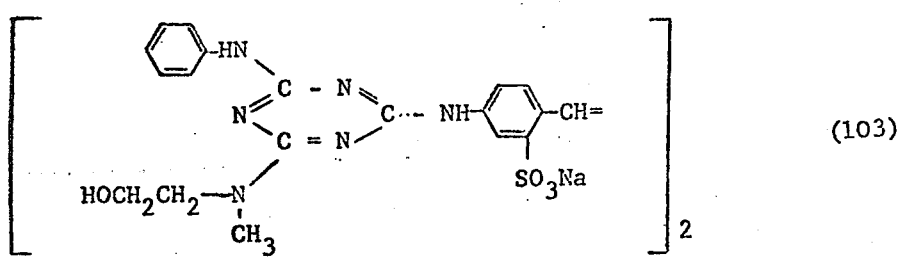

(103)

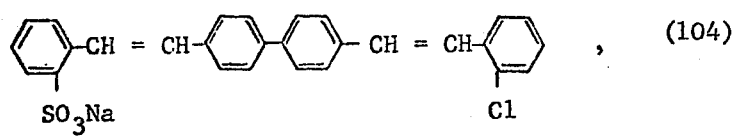

(104)

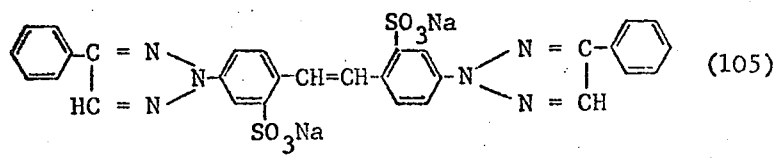

(105)

liquor is then removed by pumping off and centrifuging and the substrate is dried by a flow of warm air.

A good white effect is obtained which is protected by the simultaneously applied fixing agent from being stained if a subsequently manufacted print is washed and against staining in a domestic wash.

The following fixing agents are also suitable:

1. The condensation product of 4,4'-dihydroxy-3,3'-dimethyldiphenylsulphone, sulphuric acid and formaldehyde. Manufacture: In a suspension of 70 g of 4,4'-dihydroxy-3,3'-dimethyl-diphenylsulphone in 35 g of acetic anhydride is added dropwise while stirring and at room temperature 35 g of conc. sulphuric acid. The temperature is then raised to 98°–100°C and kept at this level for 6 hours. The 75 ml of water is added in small amounts at a pressure of 30 to 50 mm Hg column. Simultaneously 88 ml of water is distilled off from the reaction mixture. The residual reaction mixture is diluted with a further 20 ml of water, treated with 20 g of 30 percent aqueous formaldehyde solution and heated for 5 hours to 100°–105°C. The batch is then allowed to cool and the viscous condensation product is treated with 30 percent sodium hydroxide solution until a pH of 7 is reached. The resulting product may be diluted with water to any extent desired.

2. A product with similar properties is obtained by adjusting the reaction mixture to a pH of 8 to 8.5 with 30 percent sodium hydroxide solution before the formaldehyde is added.

3. The condensation product of a sulphone mixture (4,4'-dihydroxy-diphenylsulphone, 4,2'-dihydroxy-diphenylsulphone), sulphuric acid and formaldehyde.

4. The condensation product of 4,4'-dihydroxydiphenylsulphone, naphthalene, sulphuric acid and formaldehyde.

EXAMPLE 3

20 g of a polyamide fabric (nylon 6) is treated for 20 minutes at 40°C with the following liquor; 0.08 g of the fluorescent whitener of the formula (105) together with 0.1 g is dissolved in 1.5 ml of water. To this solution is added 1.5 g of the addition product of 8 moles of ethylene oxide with p.tert.octylphenol in 100 ml of 1,1,1-trichloroethane. The procedure as described in Example 1 is then carried out. The whitened finished fibre material is protected against staining on being washed.

Fixing agent

A mixture of 317 g of 4,4'-dihydroxy-4-methyldiphenylsulphone and 105.5 g of 1-hydroxy-2-methylbenzene-4-sulphonic acid in 100 ml of water is made alkaline with 463 g of 30 percent aqueous sodium hydroxide solution. Upon addition of 162 g of 37 percent aqueous formaldehyde solution the reaction mixture is stirred for 5 to 6 hours at 100°–102°C. The resulting condensation product 7 may be diluted to any desired extent with water without any precipitation resulting.

Instead of the above cited surfactant, it is also possible to use the addition products of 15 moles of ethylene oxide with oleylamine or of 4 moles of ethylene oxide with oleic acid sorbitan ester.

EXAMPLE 4

50 g of a polyamide filament yarn is treated in the following liquor for 30 minutes at 60°C; 0.5 g of the fluorescent whitener of the formula (102) is diluted with 7.5 ml of water and pasted with 7.5 g of the addition product of 15 moles of ethylene oxide with castor oil.

The paste is then diluted with trichloroethylene to 1.5 l. The liquor is then centrifuged off and the white effects obtained by applying the fluorescent whitener to the yarn are protected by treating the material for 5 minutes at 50°C with a preparation which contains 0.125 g of the fixing agent 1 according to Example 2, 10 ml of water and 8 g of the above mentioned dispersent in 0.5 l of benzene.

The liquor is then centrifuged off the yarn is dried in a flow of warm air. The yarn is protected against obtaining on being washed.

The fluorescent whitener may also be applied from an aqueous liquor, in which case an intermediate drying is appropriate before the aftertreatment.

Other suitable solvents for the aftertreatment are: trichloroethylene, toluene, dichlorobenzene, bromobenzene or pertroleum ether.

We claim:

1. A process for preventing the staining of optically-brightened synthetic polyamide fiber material, which comprises the step of applying to the fiber material at a temperature of 20° to 120°C (a) simultaneously with an optical brightener in organic solvent or (b) as an after-treatment of optically brightened fiber material, a preparation which contains a water-soluble fixing agent with affinity for the polyamide fibers, an organic solvent, and 0 to 10 percent of water, wherein the fixing agent is a polycondensation product of formaldehyde with an aryl sulphonic acid or a diarylsulphone, and wherein the optical brightening agent contains at least one water-solubilizing agent.

2. A process according to claim 1, wherein the fixing agent is applied simultaneously with the optical brightening agent in a solvent liquor.

3. A process according to claim 1, wherein fibre material treated with an optical brightening agent in solvent liquors is subjected to an aftertreatment with the fixing agent.

4. A process according to claim 1, wherein fibre material treated with an optical brightening agent in aqueous liquors is subjected to an aftertreatment with the fixing agent after an intermediate drying of the material has been effected.

5. A process according to claim 1, wherein the optical brightening agent is selected from the group consisting of mono- or disulphonic acids, their amides or carboxylic acids of 4,4'-bis-(acylamino)-stilbenes, 4,4'-bis-(triazinylamino)-stilbenes, 4,4'-bis-(azoyl)-stilbenes, stilbylnaphthotriazoles, bis-(benzoxazol-2-yl)-derivatives, monomethine cyanines, 2,7-bis-(aroylamino)-dibenzothiophene dioxides, 1,3-diarylpyrazolines, styrylbenzoxazoles, bis-styrylaryl compounds, bis-benzoxazolylarylene compounds oxidiazole compounds or quaternary benzofuranylbenzimidazoles.

6. A process according to claim 1, wherein the preparation additionally contains an organo-soluble dispersing agent.

7. A process according to claim 1, wherein the fixing agent is a water-soluble anionic polycondensation product of a sulphonated diarylsulphone with formaldehyde.

8. A process according to claim 7, wherein the fixing agent is a condensation product of formaldehyde with sulphonated dihydroxy-diphenylsulphones and naphthalenesulphonic acids.

9. A process according to claim 7, wherein the fixing agent is a condensation product of a diarylsulphone which contains at least one phenolic hydroxyl group with formaldehyde.

10. A process according to claim 9, wherein the diarylsulphone is a dihydroxydiphenylsulphone.

11. A process according to claim 1, wherein the organic solvent is immiscible with water.

12. A process according to claim 11, wherein the organic solvent is petroleum hydrocarbons, benzene and halogenated benzenes or benzenes which are substituted by lower alkyl groups, alicyclic compounds or halogenated aliphatic hydrocarbons.

13. A process according to claim 12, wherein the halogenated aliphatic hydrocarbons are 1,1,1-trichloroethane, trichloroethylene or perchloroethylene.

* * * * *